US012343858B2

(12) United States Patent
Martin

(10) Patent No.: US 12,343,858 B2
(45) Date of Patent: Jul. 1, 2025

(54) AERIAL LIFT TOOL TRAY

(71) Applicant: Rodney Hale Martin, Ponce de Leon, FL (US)

(72) Inventor: Rodney Hale Martin, Ponce de Leon, FL (US)

( * ) Notice: Subject to any disclaimer, the term of this patent is extended or adjusted under 35 U.S.C. 154(b) by 258 days.

(21) Appl. No.: 17/698,181

(22) Filed: Mar. 18, 2022

(65) Prior Publication Data

US 2023/0294271 A1 Sep. 21, 2023

(51) Int. Cl.
*B25H 3/06* (2006.01)
*B66F 13/00* (2006.01)

(52) U.S. Cl.
CPC ............... *B25H 3/06* (2013.01); *B66F 13/00* (2013.01)

(58) Field of Classification Search
CPC .................................. B25H 3/06; B66F 13/00
USPC ..................... 108/44, 42, 47, 49, 46, 147.15
See application file for complete search history.

(56) References Cited

U.S. PATENT DOCUMENTS 1,889,783 A * 12/1932 Harman ................. A47B 23/02 108/46
2,687,336 A * 8/1954 Smith .................... B60N 3/004 108/34
2,818,316 A * 12/1957 D'Andrade .............. B25H 3/06 220/482
3,037,639 A * 6/1962 Kost ...................... A47B 31/06 224/482
3,294,250 A * 12/1966 Evans .................... A47B 57/22 108/147.15
4,411,400 A * 10/1983 Everett .................. A47B 57/42 248/216.1
4,810,026 A * 3/1989 Doane .................... B60N 2/783 296/153
5,158,023 A * 10/1992 Allen ........................ E04G 5/00 182/120
5,653,178 A * 8/1997 Huczka ................ A47B 96/067 108/135
5,722,329 A * 3/1998 Weng ....................... A47B 5/00 108/47
6,095,057 A * 8/2000 Corban ................ A47B 96/027 108/42
6,546,879 B1 * 4/2003 Johnston ............. A47B 96/027 108/47
6,931,998 B1 * 8/2005 Leese ....................... A47B 5/02 108/42
7,055,802 B1 * 6/2006 Jones ........................ B62B 1/12 254/122
7,739,964 B2 * 6/2010 Hatton ................... F16M 13/02 108/135

(Continued)

*Primary Examiner* — Jose V Chen

(57) ABSTRACT

A tool tray that holds tools and parts that is attached to the sides of the aerial lift and can be moved around the sides of the lift when necessary. The aerial lift mechanic can easily mount this tool tray on either sides of the lift to make it easily accessible to utilize tools to complete the project. On one hand, the Aerial Lift Tool Tray can be used as a dual function component that allows the functionality of the tool tray to be temporarily mounted on various sides of the lift; on the other hand, the Aerial Lift Tool Tray can allow the lift mechanic to keep their tools together in one place so that the completion of the project/job can be quicker, more efficient, and without interruption of locating tools that are not together in one place.

1 Claim, 8 Drawing Sheets

(56) References Cited

U.S. PATENT DOCUMENTS

| | | | | |
|---|---|---|---|---|
| 7,938,279 | B2 * | 5/2011 | Kaplan | A47K 3/281 248/304 |
| 8,857,347 | B1 * | 10/2014 | Liu | A47B 5/02 108/47 |
| 10,028,597 | B2 * | 7/2018 | Bacallao | B65B 67/1233 |
| 10,477,960 | B1 * | 11/2019 | Johnson | A47B 5/02 |
| 10,718,120 | B1 * | 7/2020 | Haney | E04G 5/003 |
| 11,470,961 | B2 * | 10/2022 | Henry, Jr. | B60R 7/08 |
| D991,775 | S * | 7/2023 | Christensen | D8/355 |
| 11,724,631 | B1 * | 8/2023 | Arnall | A47J 36/34 108/44 |
| 2007/0101908 | A1 * | 5/2007 | Makita | A47B 5/02 108/47 |
| 2010/0155177 | A1 * | 6/2010 | Tydings, III | E06C 7/14 182/129 |
| 2014/0326841 | A1 * | 11/2014 | Goodheart | B66F 11/04 248/214 |

* cited by examiner

AERIAL LIFT TOOL TRAY

STATEMENT REGARDING FEDERALLY SPONSORED RESEARCH

Not Applicable

REFERENCE TO SEQUENCE LISTING

Not Applicable

Field of Invention

The invention relates to a tool tray that holds various parts and tools for the use by an aerial lift mechanic that is attached to the sides of the aerial lift and can easily be moved around the sides of the lift when necessary.

BACKGROUND OF THE INVENTION

A tool tray is a product that contains an assortment of tools to assist in completing various projects/jobs. A construction worker operating out of an aerial lift has no place to store their various tools while they are on the lift. Oftentimes, tools that are brought up with the aerial lift mechanic to complete their job are not easily accessible or may be the wrong tool for that particular job. In addition, if these tools are dropped to the floor, it could lead to damage to the tools and/or resulting in injury to people below the lift. By having a movable tool tray that is attached to the aerial lift will save time, money, reduce damage to equipment and/or tools, increase safety for the construction worker, and provide a higher quality job completion.

Aerial lifts are elevated machines that are used for a variety of maintenance and construction purposes. These aerial lifts are made for reaching levels of heights that other machines cannot. It is a machine with lifting mechanisms that can raise people, tools, and equipment up to various heights. They are designed to assist with operator mobility and flexibility that is important in improving job efficiency. They come in numerous models, lift heights, sizes, and applications that are suitable for both indoor and outdoor jobs.

As a result of the above, the need for a moveable tool tray that can be mounted on various aerial lifts in order to make the overall job of the aerial lift mechanic easier, quicker, safer, and more efficient becomes paramount in the aerial lift arena.

BRIEF SUMMARY OF THE INVENTION

The present invention relates to a tool tray that is moveable and can be mounted on the sides of various aerial lifts. These tool trays provide the aerial lift mechanic to efficiently and effectively complete their jobs. This is a dual-function product whereby it allows the functionality of the tool tray to be moved onto various sides of the aerial lift depending upon what the job entails, as well as keeping all necessary tools together in one place so that the job can be completed faster, more efficient, and without constant interruption of locating tools that are not together in one place. In addition, this tool tray mounts onto the sides of the aerial lift in a way that is securely fastened so that the tray is safe and secure in that particular placement on the lift.

The Aerial Lift Tool Tray has the following advantages that are outlined below:

a. The tool tray is not a permanent fixture to the aerial lift. It is designed to make the aerial lift mechanic's job easier and more accessible when completing a job.
b. The tool tray has the advantages of being a simple and compact tray that can contain the tools that are needed to complete the job.
c. Because the tool tray is moveable, there is no setting up and no preparation—the tool tray is one unit that is easily mounted on the side of the aerial lift.
d. The tool tray is made of durable material; i.e., metal, plastic, or wood, whereby it is strong and does not break. It does not have to be replaced due to wear and tear of poor manufactured products that are not safe and not secure.
e. The tool tray allows all of the necessary tools to complete the job to be close at hand for the aerial lift mechanic, which ultimately saves time.
f. Lastly, the tool tray is also a safety issue for the aerial lift mechanic. It keeps the tools together so that they do not fall off the lift resulting in damage to the tools or worse, injuring people below the lift. This tray is securely placed on the side of the lift so that nothing will fall off creating a liability issue for all involved.

This Aerial Lift Tool Tray solves previously existing problems whereby it keeps work-related tools together in one location for the convenience of the aerial lift mechanic. It is one unit that is moveable, therefore, it is not permanent and it is easily accessible and efficient. Therefore, you only need to purchase one product per aerial lift mechanic. In addition, as stated above, this Aerial Lift Tool Tray has the durability of being strong, secure, and safe on aerial lifts. It is not a permanent fixture so that it makes it convenient to move the tool tray around. It is simple and easy to mount and does not require a great deal of time in putting it onto the rails of the aerial lift.

COMPONENT LIST

100—Aerial Lift Tool Tray
101—Upper Tool Tray
102—Lower Tool Tray
103—Quick Attach Side Frames
104—Quick Attach Fastener System
104*a*—Fastener
105—Adjustable Lower Rail Rest
106—Wing Nut and Bolt Fasteners
107—Upper Rail Rest Retainer

108—Work Platform
109—Safety Rails of Aerial Lift

DETAILED DESCRIPTION OF THE INVENTION

Detailed illustrated embodiments of the present invention are disclosed herein.

Figure 1:
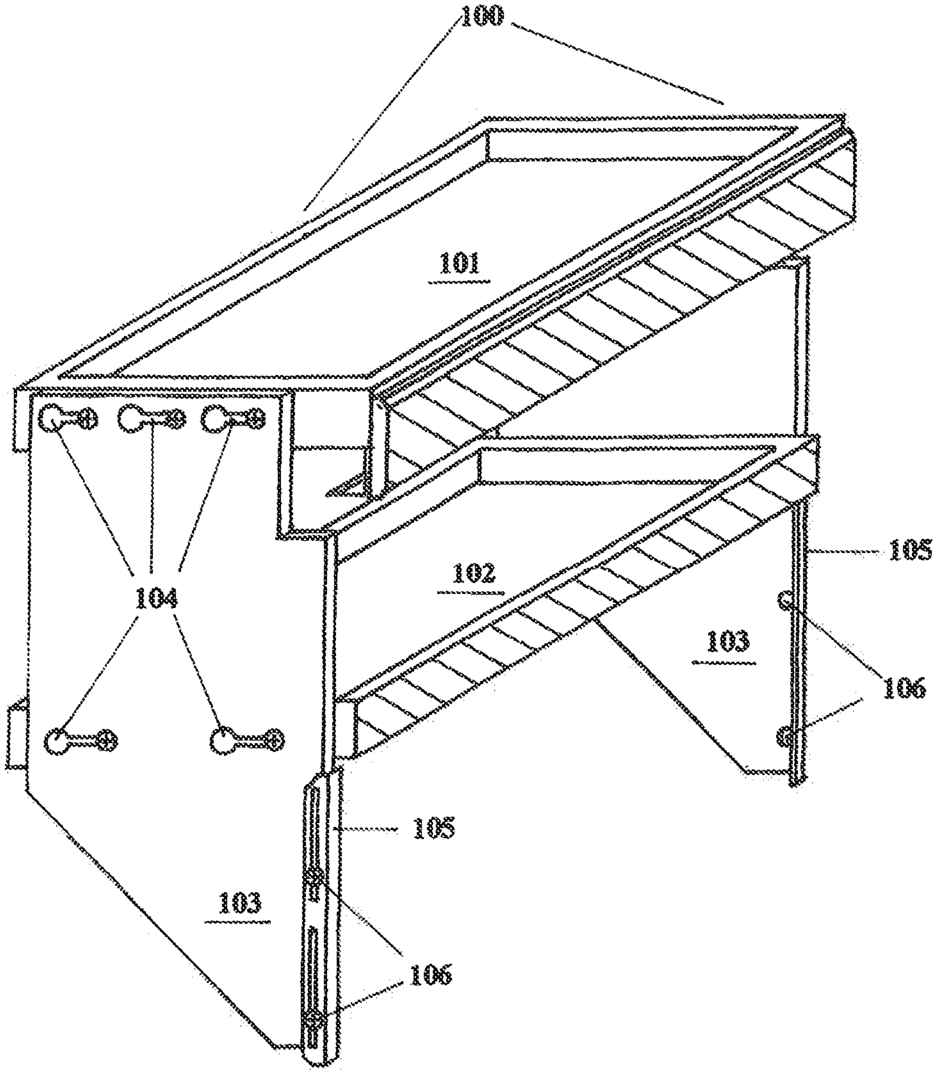
FIG. 1 shows a three-dimensional view of the Aerial Lift Tool Tray.

FIG. 1 illustrates a three-dimensional view of the invention, which is the Aerial Lift Tool Tray 100. This is a product that many construction trades can benefit from. It has the ability to be portable and can be assembled and hung onto the Safety Rails of Aerial Lift 109 in just a few minutes. Its' design has an Upper Tool Tray 101 and a Lower Tool Tray 102 allowing for more space for fasteners, tools, and other items. As the worker stands on the Work Platform 108 of the aerial lift, they can easily access tools or other items they may need without bending down to retrieve them from where they are standing, making it safer to walk around the Work Platform 108.

Figure 2:
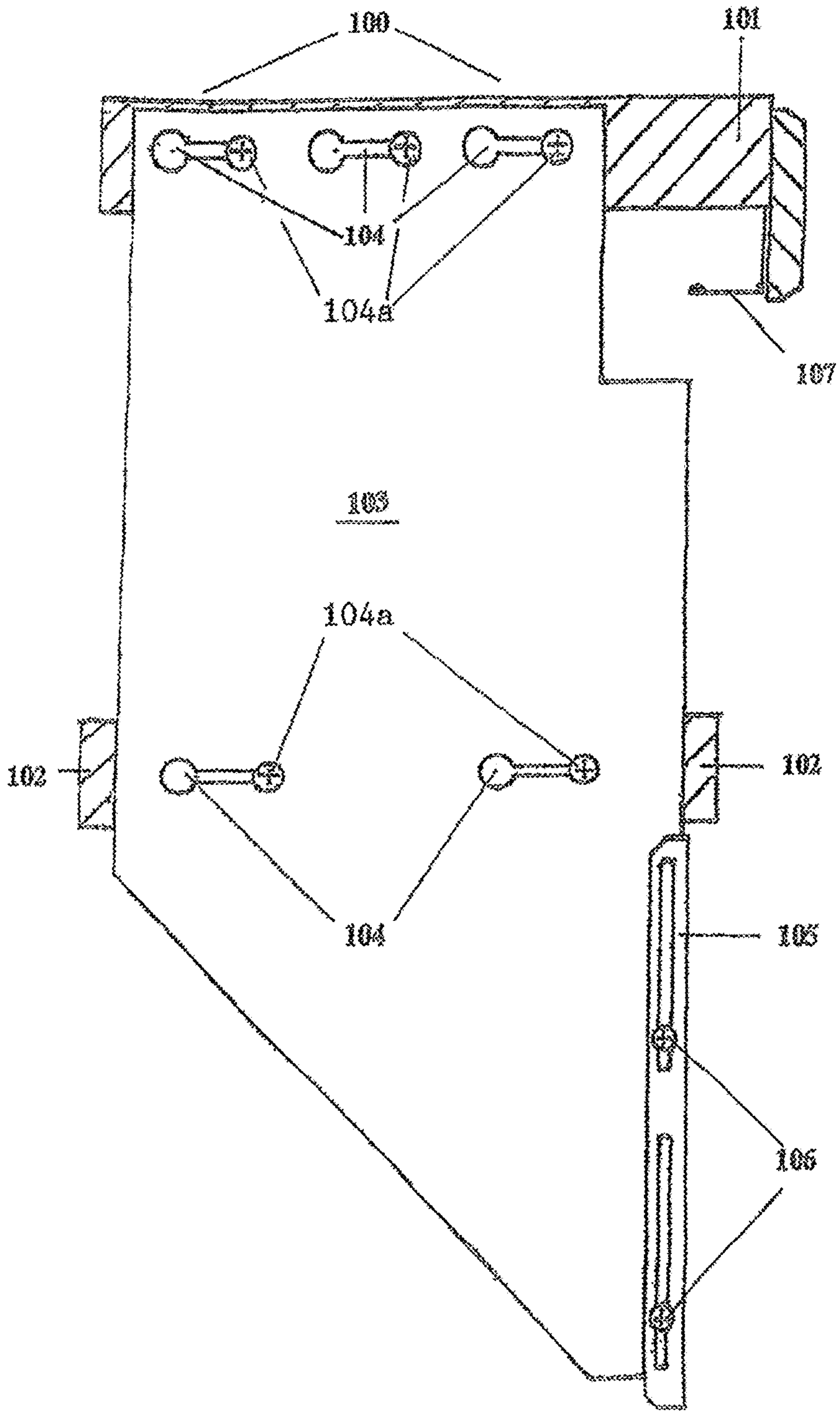
FIG. 2 shows an elevational view of the left side if facing the front of the tool tray.

FIG. 2 illustrates a left side Quick Attach Side Frame 103 elevational view of the Aerial Lift Tool Tray 100 if facing the front. The Aerial Lift Tool Tray 100 can hang from either side of the Work Platform 108 and either inside or outside of Safety Rails of Aerial Lift 109 quickly and easily because of its' ability to hang from the Safety Rails of Aerial Lift 109 without fasteners.

Figure 3:
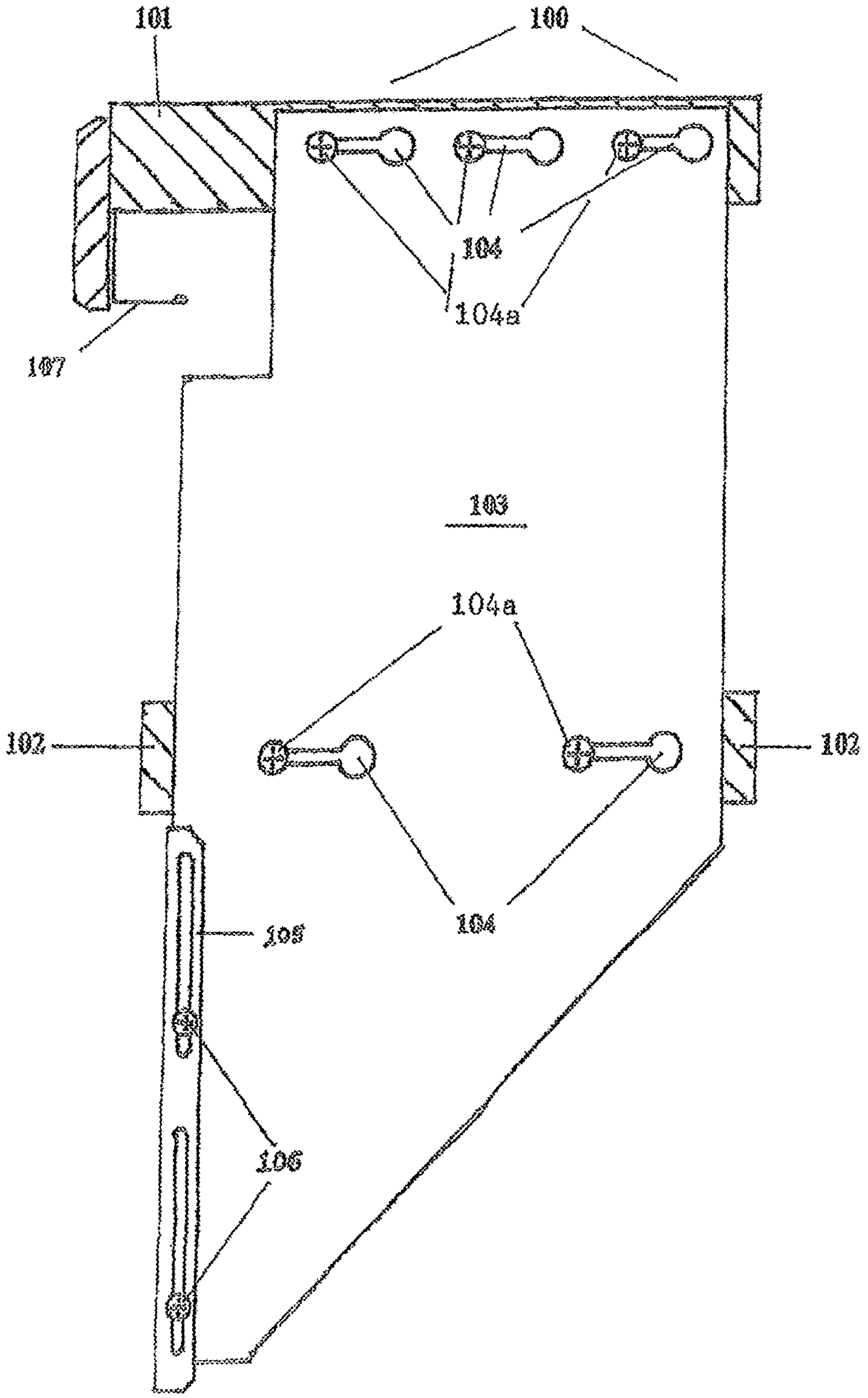
FIG. 3 shows an elevational view of the right side if facing the front of the tool tray.

FIG. 3 illustrates the right side of the Quick Attach Side Frame 103 elevational view if facing the front of the Aerial Lift Tool Tray 100. This view also illustrates the holes and slots of the Quick Attach Fastener System 104 which allows you to quickly assemble and disassemble the Aerial Lift Tool Tray 100 for easier storage or transport. In order to accomplish this task, loosen the Phillip Head screw and slide the Quick Attach Side Frame 103 forward through the slot until the Phillip Head screw comes out of the hole.

Figure 4:
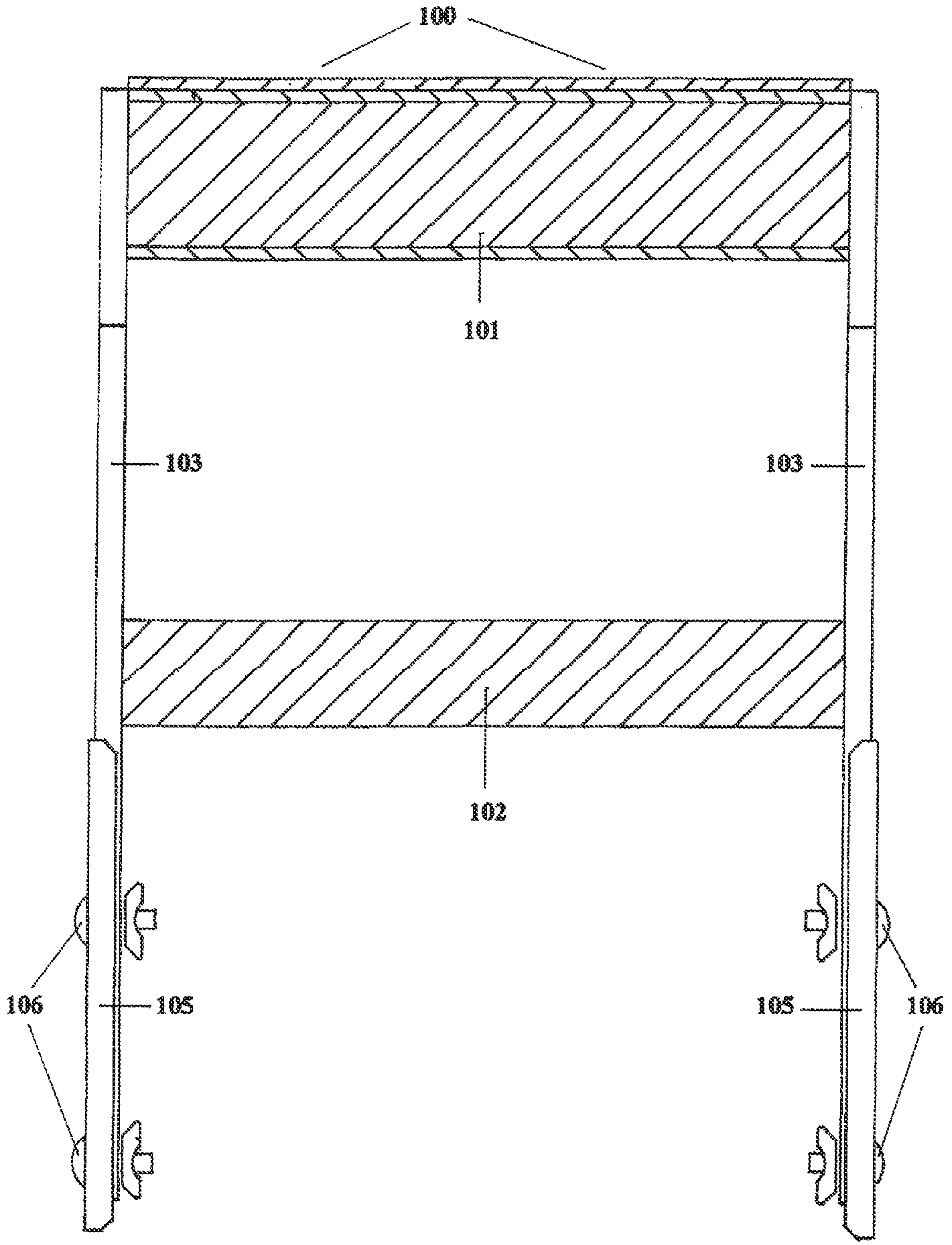
FIG. 4 shows an elevational view of the front of the tool tray.

FIG. 4 illustrates the front elevational view of the Aerial Lift Tool Tray 100. This side, while in use, would typically be the side that faces the Work Platform 108. This side also has the Upper Rail Rest Retainer 107, which keeps the Aerial Lift Tool Tray 100 from coming off the Safety Rails of Aerial Lift 109.

Figure 5:
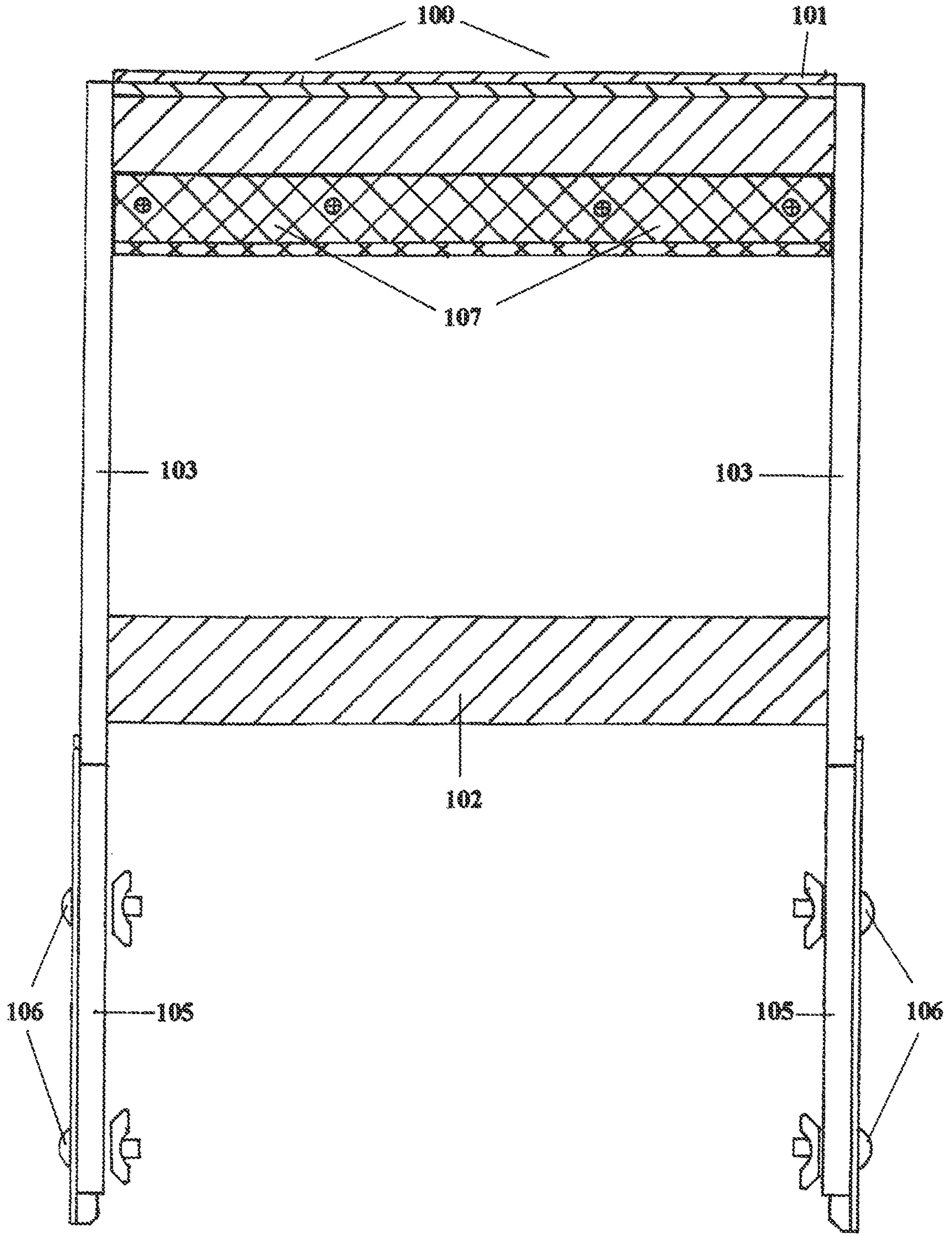
FIG. 5 shows an elevational view of the back of the tool tray.

FIG. 5 illustrates the.back elevational view of the Aerial Lift Tool Tray 100. This shows the Upper Rail Rest Retainer 107 and the Phillip Head fasteners holds the Upper Rail Rest Retainer 107 to the Upper Tool Tray 101. The Upper Rail Rest Retainer 107 is indicated by a cross-hatch pattern. This elevation also illustrates the Adjustable Lower Rail Rest 105. It is attached to the Quick Attach Side Frame 103 with Wing Nut and Bolt Fasteners 106 for a no-tool quick adjustment. The Adjustable Lower Rail Rest 105 is used in situations where on certain Aerial Lift models the lower rail is lower than the bottom of the Quick Attach Side Frame 103. It also serves as a protective guard between the Quick Attach Side Frame 103 and the Safety Rails 109 on the Aerial Lift.

Figure 6:
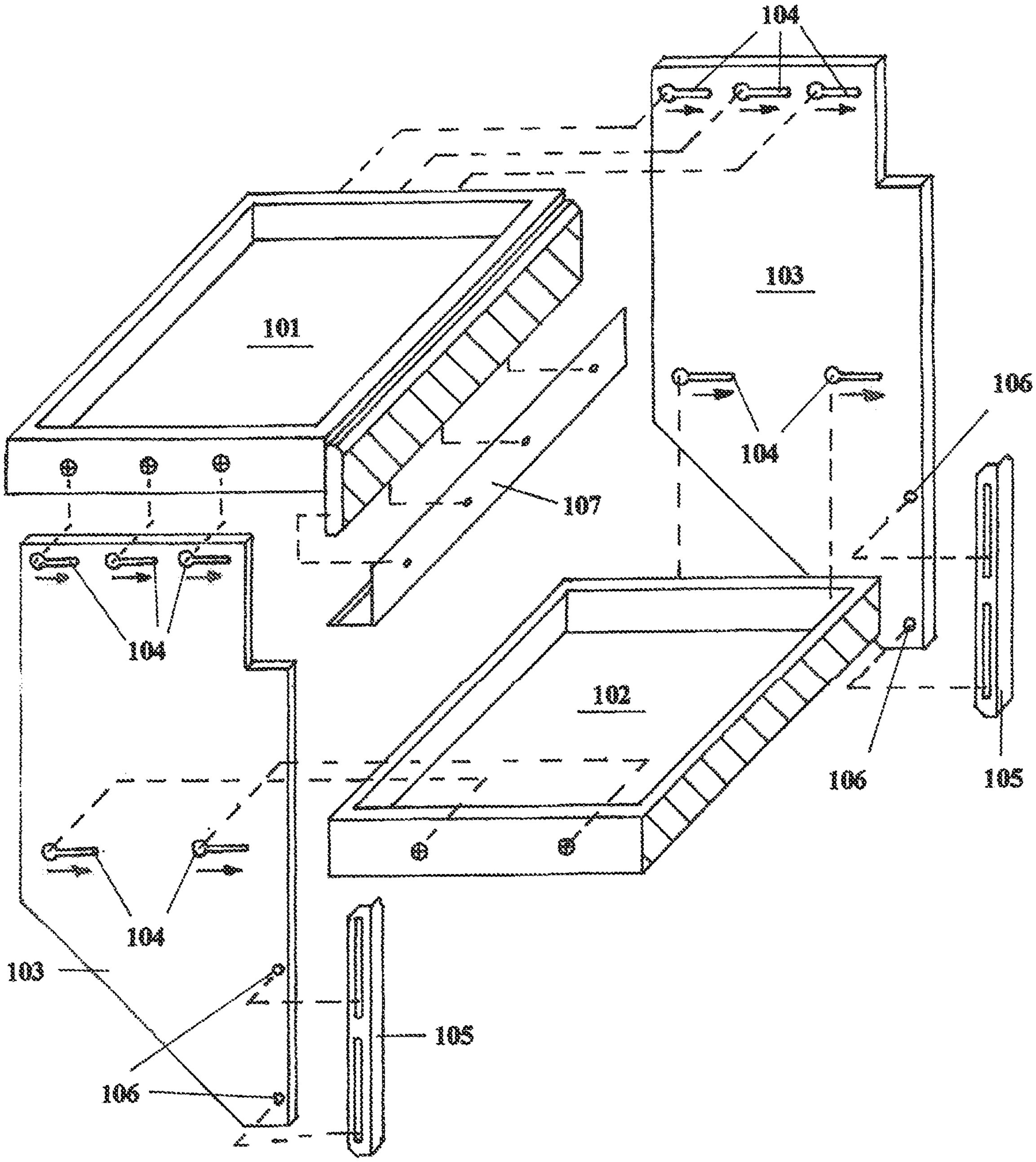
FIG. 6 shows an exploded three-dimensional view of the tool tray.

FIG. 6 illustrates the an exploded view of the Aerial Lift Tool Tray 100. The materials used to construct this product could be wood, metal, plastic, or any combination there of and would be strong for durability and longevity.

Figure 7:
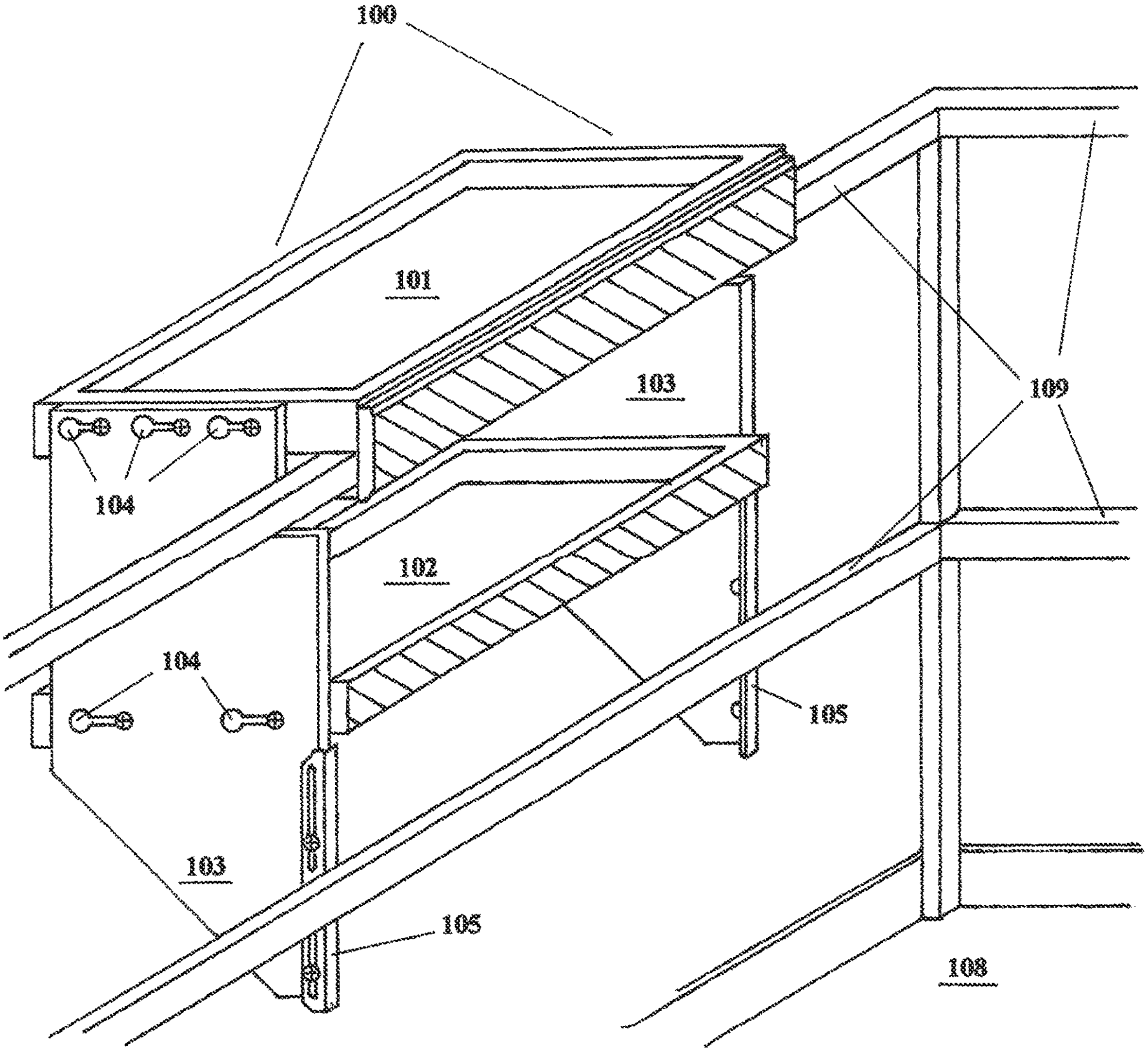
FIG. 7 shows a three-dimensional view of the tool tray in its working position hooked onto and hanging from an aerial lifts' work-basket railing.

FIG. 7 illustrates a three-dimensional view of the Aerial Lift Tool Tray 100 hanging on the Safety Rails 109 of the Aerial Lift, with the front facing the Work Platform 108. Some work situations may require the Aerial Lift Tool Tray 100 to face the other direction where the Aerial Lift Tool Tray 100 is inside the Work Platform 108 because of clearance issues outside the Work Platform 108.

Figure 8:
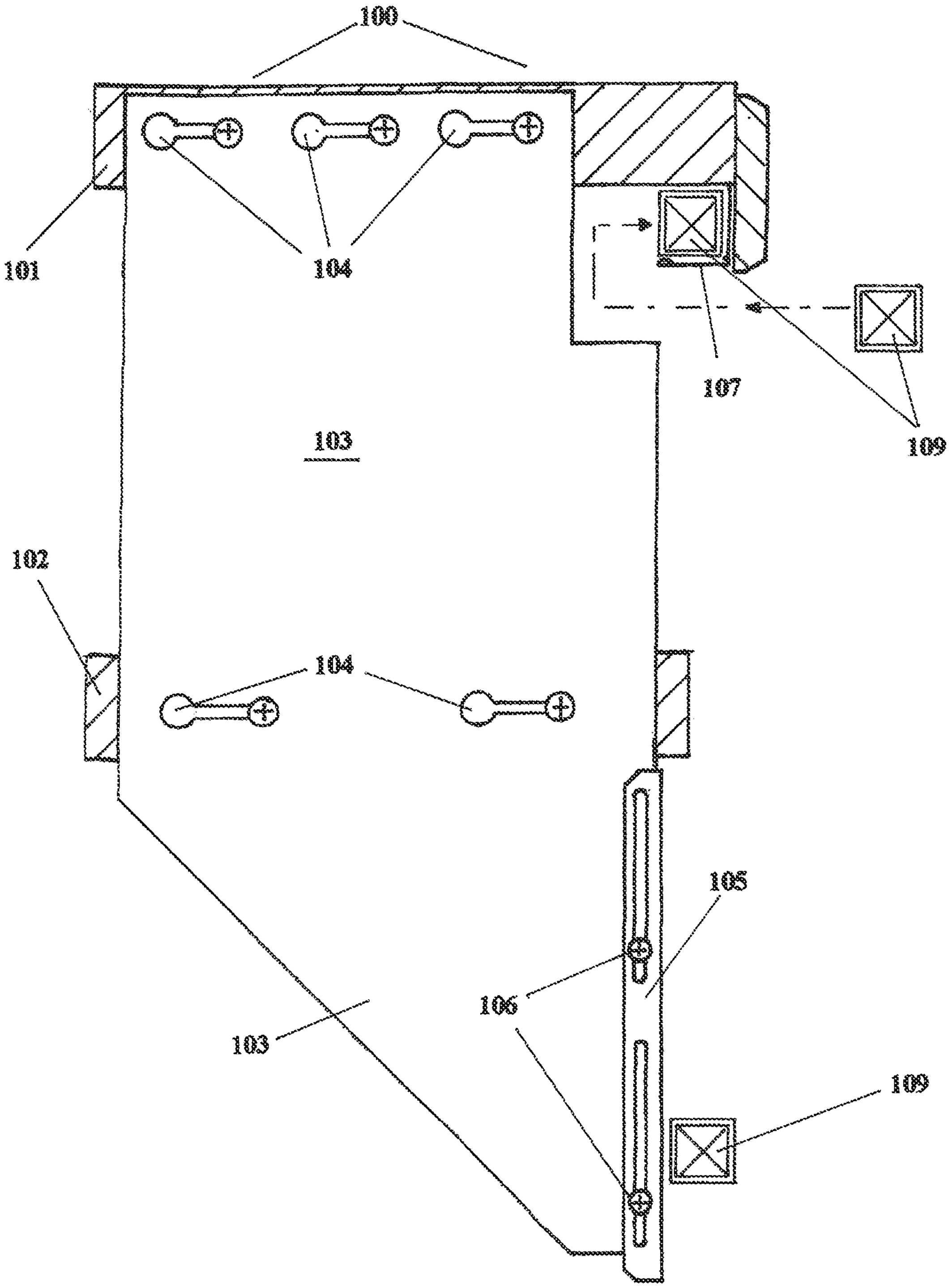
FIG. 8 shows an elevational view that shows it on the railing of the aerial lifts' work basket.

FIG. 8 illustrates the elevational view of the left side of the Aerial Lift Tool Tray 100. This shows how the Safety Rails 109 comes into contact with the Aerial Lift Tool Tray 100 and how the Safety Rail 109 passes through the Upper Rail Rest Retainer 107 channel, which it hangs from.

The disclosed embodiments have been described in full details of the structure and features of this invention, which comprises of an Aerial Lift Tool Tray that attaches to an aerial lift. Several examples have been described that have been referenced to various disclosed embodiments. These embodiments are for the illustration purposes and are not limited in nature. This invention should not be limited to the design of the Aerial Lift Tool Tray and is not limited to the particular embodiments that are disclosed herein. It is however, intended to cover all modifications, changes, and adaptations within the scope of this present invention as is defined by the appended claim.

What is claimed is:

1. An Aerial Lift Tool Tray comprising:

A portable quick-attach design, which involves lifting an aerial lift tool tray to a height of a top safety rail of a work platform and hooking said aerial lift tool tray over said top safety rail of said work platform, letting it drop down and rest on said top safety rail of said work platform, if standing in said work platform, one would push said aerial lift tool tray away from oneself into said aerial lift tool trays' final resting position;

further comprising a quick-attach side frames that allows for fast assembly and disassembly for transporting and storage of said aerial lift tool tray, said quick-attach side frames are held together to an upper tool tray and a lower tool tray with a quick-attach fastener system;

further comprising a fastener(s) that fits through said quick-attach fastener system's holes in said quick-attach side frames, when all said fasteners on both said upper tool tray and said lower tool tray are protruding through said quick-attach fastener system's holes in said quick-attach side frames, the next step is to holds said quick-attach side frames stationary and slide said upper tool tray and said lower tool tray into quick-attach fastener system's slots connected to the said quick-attach fastener system's holes and tighten said fastener securing said quick-attach side frames to said upper tool tray and said lower tool tray;

further comprising a mounting design that allows an aerial lift user to quickly and easily without fasteners reposition said aerial lift tool tray to a different side or end of a safety rails that surround said work platform of said aerial lift;

further comprising said upper level tool tray and said lower level tool tray that provides more space for a tool(s), fasteners, and other items needed to safely and efficiently complete projects without having to place said tools, fasteners, and other items on the said work platform where space is limited and should be free and clear of said tools, fasteners, and other items to safely walk around;

further comprising an adjustable lower rail rest that extends the said quick-attach side frames position of rest to be lower if needed and also serves as a guard between said quick-attach side frames and said a lower safety railing of said work platform;

further comprising a wing nut and bolt fastener to make adjusting said adjustable lower rail rest more user friendly; said adjustable lower rail rest is used to lengthen said quick-attach side frame to make contact with a varying height of said lower safety rails of said aerial lift work platform; said adjustable lower rail rest is an aluminum angle with a slot one above the other said slot on a same side of said adjustable lower rail rest that said wing nut and bolt fasteners goes through and into said adjustable lower rail rest and into a hole(s) in said quick-attach side frames, with said wing nuts loosened, said adjustable lower rail rest can adjust up or down through said slots in said adjustable lower rail rest, then said wing nuts can be tightened when desired position is achieved, said adjustable lower rail rest does not level said aerial lift tool tray but guards said quick-attach fastener systems;

further comprising a construction of, a wood, a metal, or a plastic material for a long-lasting product;

further comprising a strong, durable finish that will protect the materials used to construct it.

* * * * *